United States Patent

[11] 3,570,820

| [72] | Inventor | Douglas W. Macleod |
| | | Oxford, Conn. |
| [21] | Appl. No. | 790,021 |
| [22] | Filed | Jan. 9, 1969 |
| [45] | Patented | Mar. 16, 1971 |
| [73] | Assignee | USM Corporation |
| | | Boston, Mass. |

[54] BANBURY-TYPE MIXER DUST STOP
1 Claim, 4 Drawing Figs.

[52] U.S. Cl. .................................................. 259/109
[51] Int. Cl. .................................................. B01f 7/02
[50] Field of Search ...................................... 259/109,
110, 104, 106, 9, 10, 6, 25, 26, 21, 22, 45, 46, 41,
42, (Bearings and Seals); 277/110, 113, 127, 73

[56] References Cited
UNITED STATES PATENTS
2,963,308  12/1960  Valentyne .................. 259/109X
FOREIGN PATENTS
656,814  1/1963  Canada ........................ 259/104

*Primary Examiner*—Robert W. Jenkins
*Attorney*—Kenyon & Kenyon Reilly Carr & Chapin ABSTRACT: A Banbury-type mixer dust stop having the usual mechanical spring applying force to the dust stop yoke, has cylinder and piston reciprocative elements with one element connected to the yoke and the other element connected to the spring.

PATENTED MAR 16 1971

3,570,820

INVENTOR
BY DOUGLAS W. MACLEOD
Kenyon & Kenyon
ATTORNEYS

BANBURY-TYPE MIXER DUST STOP

This invention relates to Banbury-type mixer dust stops.

A Banbury-type mixer as this term is used herein, means any mixer which includes a body internally defining a completely enclosed mixing chamber in which one or more rotors operate. These rotors have ends forming shafts which extend through openings formed in the body so that the opposite shafts of each rotor may be journaled externally. The materials being mixed may include one or more components producing dust in the mixing chamber, as for example when carbon black is being mixed with rubber. With two rotors, there must be four openings in the mixer body, with each opening defining an annular space around the shaft extending through that opening. It is undesirable to have dust escape through these openings.

With the above in mind, it is prior art to have each annular opening sealed by a dust stop. This is an assembly comprising an annular, pressure-operated, sealing gland surrounding the rotor shaft, a gland ring for applying sealing pressure by bearing on this gland, a dust stop yoke having yoke pins pressing against the gland ring, and a yoke stud on which the yoke is fulcrumed. The yoke has an end projecting beyond the stud for receiving force to rock the yoke on the yoke stud so that the yoke pins apply pressure to the gland ring. A mechanical spring, usually a coil compression spring, applies the force to the yoke end when the spring is strained.

Conventionally, in the above assembly the spring is strained by a screw on the yoke end which strains the spring, by compressing the spring when it is a coil compression spring, more or less as required to apply the proper sealing pressure through the gland ring to the pressure-operated sealing gland surrounding the rotor shaft.

One disadvantage of the above is that with two rotors changes in sealing pressure require individual adjustment of the four spring adjusting screws of the four dust stops. The four screws must be adjusted individually to obtain proper sealing pressure and they must be all released and retightened whenever it is necessary to fully release the sealing pressure to purge or clean the sealing surfaces of the dust stops by permitting a short period of flow through the sealing surfaces. Another disadvantage is that the mixing rotors and therefore the rotor shafts have a certain amount of axial movement during the mixing operation. This movement alternately increases and decreases the strain of the dust stop springs applying the sealing pressure, with constant changes in the sealing pressure, which is undesirable.

According to the present invention the described assembly has means for transmitting the force of the spring of each dust stop through controllable hydraulic pressure so that by controlling this pressure, the strain of the spring and therefore the force it exerts, is controlled. Such means may be in the form of cylinder and piston relatively reciprocative elements, having one element connected to the yoke end and the other element connected to the spring. The hydraulic pressure may be connected to all four means be interconnecting pipelines supplied by a controllable hydraulic pressure source, preferably capable of maintaining a constant pressure of any desired value.

With the above arrangement the four dust stops may all be controlled with hydraulic pressure of a constant value so that a constant sealing force is applied to all four dust stops. The pressure can be controlled so that all four dust stops can be adjusted simultaneously, and by reducing or eliminating the pressure, the sealing pressure of all four dust stops may be simultaneously relieved for purging. With the four dust stops supplied with liquid of the same constant pressure, the strain of the four dust stops' springs is constant regardless of axial rotor motion.

A specific example of the invention is illustrated by the accompanying drawings in which.

Figures 1, 2, 3, 4:
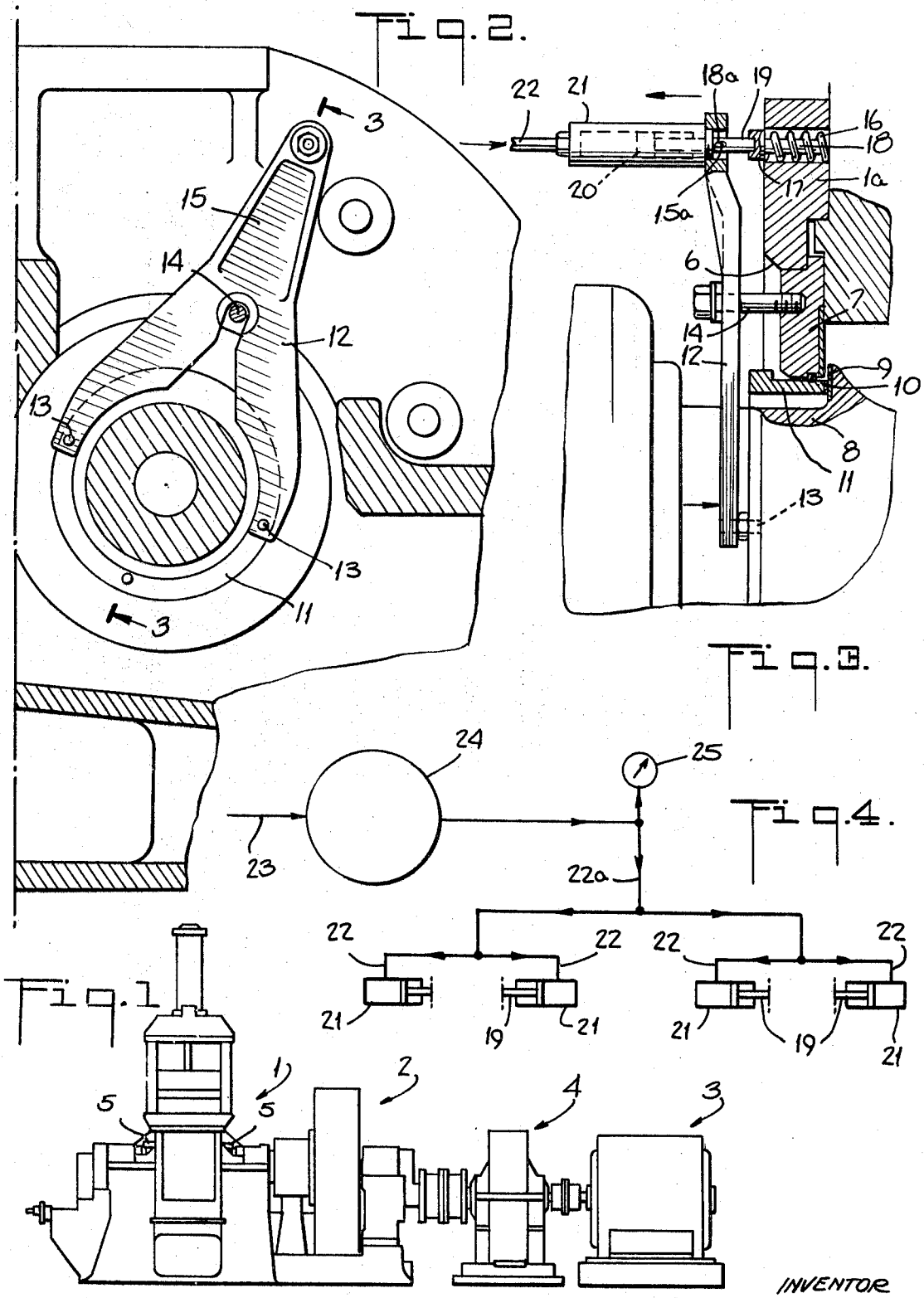
FIG. 1 is an elevation of a Banbury-type mixer.
FIG. 2 is an end view of one of the dust stops of this mixer, embodying the principles of the present invention.
FIG. 3 is a side view, partially in section, taken on the line 3—3 in FIG. 2.
FIG. 4 schematically shows the control of the hydraulic pressure supplied to the four dust stops to seal all four rotor shafts of the mixer of FIG. 1.

Referring to the above drawings, FIG. 1 shows the Banbury-type mixer 1 driven through a drive gear 2 by a motor 3 working through a reduction gear drive 4. Because this figure is an elevation, only the two dust stops 5 are visible, but it is to be understood that there must be two more for the rotor shafts which cannot be seen.

FIGS. 2 and 3 show the details of the new dust stop assembly embodying the principles of the present invention and described in detail below.

The mixer body end wall 1a has a rotor shaft opening partially closed by a rotor end plate 7. The rotor shaft 8, of course, projects through the rotor shaft opening. Inside of the end wall 1a the rotor has a radial flange 9 against which a gland ring facing 10 is pressed by the gland ring 11. Pressure is applied to the gland ring 11 by the dust stop yoke 12 having yoke pins 13 bearing on the outside of the gland ring 11. The yoke 12 is fulcrumed on a yoke stud 14 and has an end 15 projecting beyond that this stud 14 for receiving the outwardly directed force which rocks the yoke so the yoke pins 13 apply pressure to the gland ring 11. This outward force is applied by a coil compression spring 16. According to the prior art the connection between the end of this coil spring 16 and the end 15 of the yoke end was done by way of an adjustable screw.

For example, the button 17 of the rod 18 end encircled by the compression coil spring 16, would be engaged by an adjusting screw screwed through the end 15 of the yoke 12. By screwing this screw in or out, the compression of the spring 16, and therefore the strain in this spring, could be adjusted.

However, in the present instance the above-described adjusting screw is replaced by the piston rod 19 of a piston 20 which reciprocates in a hydraulic cylinder 21 having its forward end screwed into hole in the yoke end 15. When there is no hydraulic pressure in the back end of the cylinder 21, which means on the left side of the piston 20 as it is seen in FIG. 3, the spring 16 is unstrained and there is little or no sealing pressure applied by the yoke pins 13 to the gland 11. The introduction of hydraulic pressure to the left-hand or back end of the cylinder 21, as by way of a pipe 22, compresses the spring 16 so that it is star strained, or fully bottomed or collapsed, with the result that the end 15 of the yoke 12 is pushed outwardly and sealing pressure on the gland ring 11 is established. The pressure applied depends on the hydraulic pressure used.

In the schematic FIG. 4, the four cylinders 21 of the usually necessary four dust stop assemblies, are all interconnected by pipelines 22 to a common pipeline 22a supplied with hydraulic pressure by a supply pipeline 23 through a pressure regulating valve 24. This valve, or its equivalent, should be capable of maintaining a constant pressure in the pipeline 22a of any value desired. The pressure may be read by a pressure gauge 25. The system should be hydraulic to avoid the compressibility of air.

Control of the valve 24 to reduce the pressure to an adequate low degree permits the purging action previously described, and this may be done for all four dust stops simultaneously. By use of adequate pressure the sealing pressure of all four dust stops may be simultaneously adjusted and this adjustment will all be to the same degree because all four hydraulic cylinders 21 are interconnected. If there is end play or axial motion of the rotors and their shafts, the sealing pressure does not change when the dust stop cylinders 21 are all supplied with the same constant hydraulic pressure.

The spring 16 may continue to play a part in the operation. Thus the yoke end 15 has a transverse pin 15a which extends through a longitudinally elongated hole formed through the piston rod 19. With the pin engaging the inner end of this hole, as is shown, the spring constantly applies some sealing force to the ring gland. This may be a small force which permits purging but is adequate to preload the parts only to hold them together. In any event the spring may absorb shock if the fluid pressure is increased too quickly from a low or no pressure condition.

It is to be understood that other means for compressing the spring 16 through through controllable hydraulic pressure to the yoke end 15 of each dust stop may be used. The cylinder and piston unit shown is of a type readily obtainable on the open market and so had has this advantage. However, any device used should be capable of permitting relative reciprocation of the elements to release enough strain from the spring 16 when the d hydraulic pressure is relieved, if the described purging action is desired.

The spring 16 of each dust stop assembly may be a very low pressure spring. It may provide just enough pressure to keep the parts of the dust stop from disassembling when there is no hydraulic pressure. Then when the hydraulic pressure is increased the spring easily bottoms or fully collapses and all of the sealing pressure is obtained from the hydraulic pressure with the latter controlled to provide the proper sealing pressure. If the rotor moves axially the liquid from the assembly on one end can move through the pipeline to the one on the other end of this rotor. This uniform pressure is maintained on all of the gland rings.

It is to be understood that in FIG. 3 the dust stop is shown as it appears when purging is underway. When the hydraulic pressure is applied, the spring 16 is compressed and the parts 9 and 10 seal under the applied pressure.

I claim:
1. A Banbury-type mixer dust stop assembly including a mixer body having a rotor shaft opening, a rotor shaft extending outwardly through said opening, an annular pressure operated sealing gland surrounding said shaft, a gland ring for applying sealing pressure to said gland, a dust stop yoke having yoke pins for pressing against said gland ring, a yoke stud on which said yoke is fulcrumed, said yoke having an end projecting beyond said stud for receiving force to rock the yoke so that said stud for receiving force to rock the yoke so that said yoke pins apply pressure to said gland ring, and a mechanical spring applying said force to said yoke end when the spring is strained; wherein the improvement comprises means for transmitting controllable hydraulic pressure to said yoke end so that by controlling the hydraulic pressure the sealing force is controlled, said means comprising relatively reciprocative elements between which the hydraulic pressure is applied with one element connected to said yoke end and the other element connected to said spring, the relative reciprocation of said elements being adequate to release sufficient strain from said spring, when the fluid pressure is relieved, to permit purging of said sealing gland, but being limited to cause said spring to always remain strained to a degree applying enough force to said yoke end to retain said yoke, sealing gland and gland ring against disassembling.

PO-1050
(5/69)

UNITED STATES PATENT OFFICE
CERTIFICATE OF CORRECTION

Patent No. 3,570,820  Dated March 16, 1971

Inventor(s) Douglas W. Macleod

It is certified that error appears in the above-identified patent and that said Letters Patent are hereby corrected as shown below:

On the Title Page:
At item "[54]" delete "BANBURY-TYPE" and substitute therefor --INTENSIVE--.
In the Abstract:
At line 1, delete "A Banbury-type" and substitute therefor --An intensive--.
In the Specification:
Column 1:
Line 1, delete "BANBURY-TYPE" and substitute therefor --INTENSIVE--;
Line 2, after "to" delete "Banbury-type" and substitute therefor --intensive--;
Line 3, delete "A Banbury-type" and substitute --An intensive--;
Line 71, after "of" delete "a Banbury-type" and substitute therefor --an intensive--.
Column 2:
Lines 4 and 5, delete "Banbury-type" and substitute therefor --intensive--.
In the Claims:
At claim 1, line 1, delete "A Banbury-type" and substitute therefor --An intensive--.

Signed and sealed this 25th day of January 1972.

(SEAL)
Attest:

EDWARD M. FLETCHER, JR.
Attesting Officer

ROBERT GOTTSCHALK
Commissioner of Patents